United States Patent
Bedi et al.

(10) Patent No.: US 11,706,314 B2
(45) Date of Patent: Jul. 18, 2023

(54) CONFIGURATION OF WORKFLOWS FOR COORDINATED DEVICE ENVIRONMENTS

(71) Applicant: Amazon Technologies, Inc., Seattle, WA (US)

(72) Inventors: Kawarjit Bedi, Sammamish, WA (US); Sravan Kumar Nandamuri, Bellevue, WA (US); Piyush Gupta, Issaquah, WA (US); Atulya Beheray, Sammamish, WA (US); James Gosling, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/200,049

(22) Filed: Nov. 26, 2018

(65) Prior Publication Data

US 2020/0169619 A1 May 28, 2020

(51) Int. Cl.
*H04L 67/60* (2022.01)
*G06F 8/30* (2018.01)
(Continued)

(52) U.S. Cl.
CPC .............. *H04L 67/60* (2022.05); *G06F 8/313* (2013.01); *G06F 9/5072* (2013.01); *H04L 67/125* (2013.01)

(58) Field of Classification Search
CPC ....... H04L 67/32; H04L 67/125; G06F 8/313; G06F 9/5072
See application file for complete search history.

(56) References Cited

U.S. PATENT DOCUMENTS

| 2014/0185607 A1* | 7/2014 | Mashimo | H04L 45/04 370/351 |
| 2014/0241354 A1* | 8/2014 | Shuman | H04W 4/70 370/390 |

(Continued)

FOREIGN PATENT DOCUMENTS

WO WO 2018/126077 A1 7/2018

OTHER PUBLICATIONS

International Search Report and Written Opinion received in PCT Application No. PCT/US2019/062791 dated Mar. 4, 2020.

*Primary Examiner* — John A Follansbee
*Assistant Examiner* — Fadi Haj Said
(74) *Attorney, Agent, or Firm* — Knobbe Martens Olson & Bear LLP

(57) ABSTRACT

A coordinated network service that facilitates the design and implementation of a coordinated device network of IoT devices. The coordinated network service defines modules for individual IoT devices or coordinated devices that specify the necessary inputs to the device, the outputs from the device and communication protocols. Via an interface, user devices can select a set of IoT devices and specify how they are connected and the decision making logic associated with communication flow. The coordinated network service can then automatically generate mapping information that implements the decision making logic and provides necessary transformations for communications between the specified devices. The selected modules and mappings form a workflow for the coordinated device network. The coordinated network service can then generate executable code to implement the formed workflow in a coordinated device network.

26 Claims, 9 Drawing Sheets

(51) Int. Cl.
　　　*G06F 9/50*　　　　(2006.01)
　　　*H04L 67/125*　　(2022.01)

(56) References Cited

U.S. PATENT DOCUMENTS

| | | | |
|---|---|---|---|
| 2016/0065653 A1* | 3/2016 | Chen | H04L 41/0813 715/735 |
| 2016/0103899 A1* | 4/2016 | Zheng | G06F 16/284 707/602 |
| 2017/0187807 A1* | 6/2017 | Clernon | H04L 67/34 |
| 2018/0234496 A1* | 8/2018 | Ratias | A63F 13/60 |

* cited by examiner

CONFIGURATION OF WORKFLOWS FOR COORDINATED DEVICE ENVIRONMENTS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the computing devices that communicate via the communication network can correspond to devices having a primary function as a computing device, such as a desktop personal computer. In other environments, at least some portion of the computing devices that communication via the communication network can correspond to embedded devices or thin devices that have at least one alternative primary function, such as household appliances having a separate primary purpose (e.g., a thermostat or refrigerator) while also providing at least limited computing functionality. In some instances, the local user interfaces of these embedded devices or thin devices are limited, and thus remote management may be required to implement some functions of these devices.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
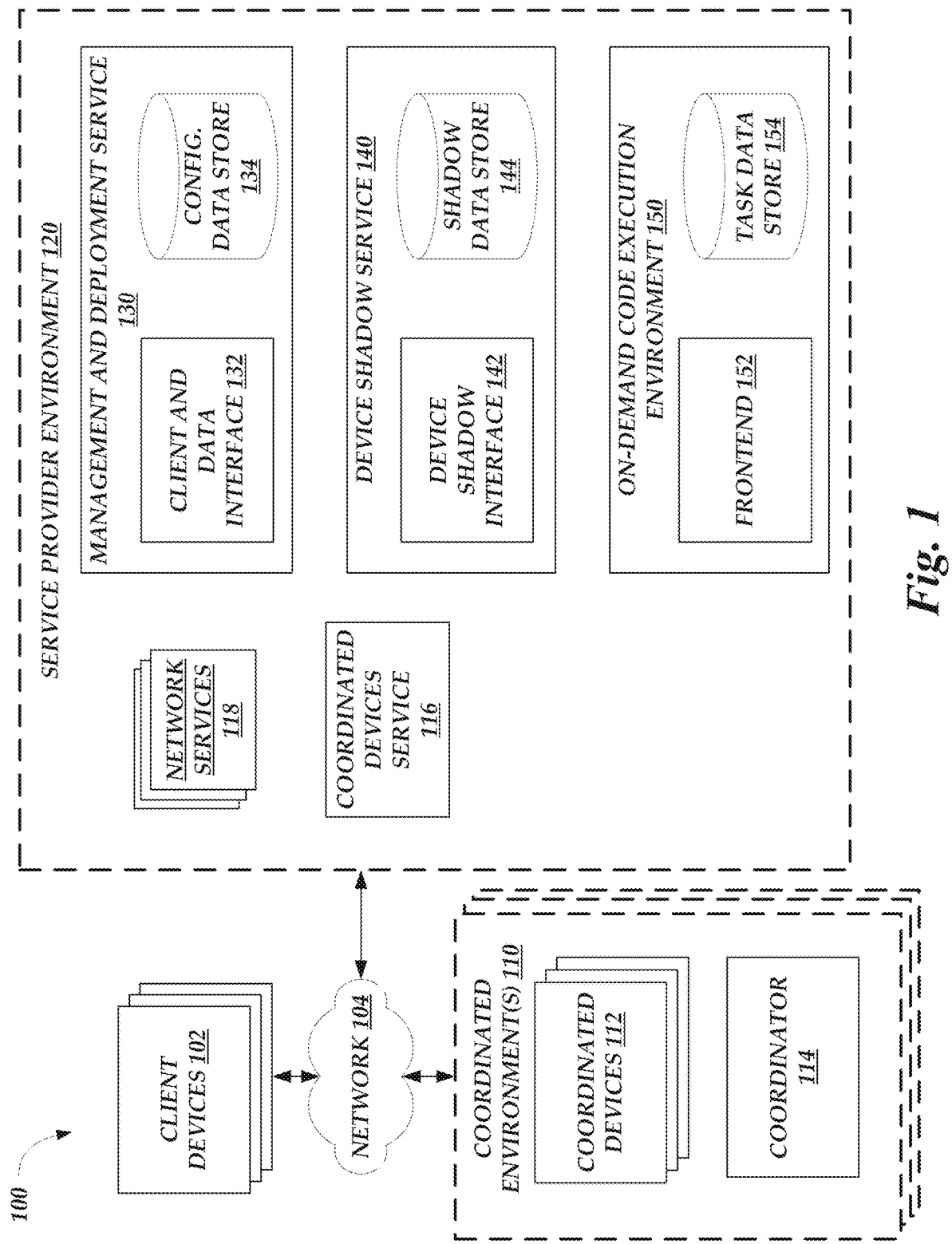
FIG. 1 is a block diagram depicting an illustrative environment in which a coordinator can operate to locally manage and coordinate operation of coordinated devices within a coordinated environment, and wherein the coordinator may communicate with client devices and a service provider environment to implement workflows.

Generally described, aspects of the present disclosure relate to a coordinator present within a coordinated environment to control operation and functionality of coordinated devices within the coordinated environment. In some instances, coordinated devices may correspond to embedded devices or thin devices that have at least one alternative primary function, such as household appliances having a separate primary purpose. Such devices may in some instances be referred to as "Internet-of-Things" devices, or "IoT" devices. Coordinated devices may include access to computing device resources, and may thus benefit from remote management. For example, a coordinated device may be configured with a graphical processing unit, or GPU, that can be accessed as a computing device resource during the execution of executable code by the coordinated device. The coordinator disclosed herein enables such remote management of coordinated devices locally, within an environment including the coordinator and the coordinated devices (such as a local area network, or "LAN," environment).

Use of a coordinator can thus enable management of coordinated devices without requiring communications external to the local environment, thereby allowing a reduction in privacy risks and an increase in communication speed over the use of external or public communication networks. Specifically, aspects of the present disclosure relate to the utilization of a coordinator as a localized on-demand code execution system, enabling rapid execution of portable segments of code to implement functions on the coordinator. These portable segments of code may be referred to herein as "tasks." In some instances, tasks may be utilized to coordinate functionality of a coordinated device, such as by changing the state of the device. For example, where a coordinated device is a network-enabled light, a task may function to change the state of the light (e.g., to "on" or "off") according to an input to the coordinator, such as the current time, a user input, or the state of another coordinated device. The coordinator may further enable communication coordinated devices and tasks according to a number of different protocols, and in some instances provide translation functions between such protocols. Still further, the coordinator may in some instances manage an execution location of a task, such that the task may be executed on the coordinator, on a coordinated device, or on a device of a remote environment (e.g., a remote network computing environment), according to capabilities of candidate devices and requirements for execution of the task. These tasks may in some instances be user-defined, enabling users to implement a variety of functionalities on the coordinator or coordinated devices, according to user-submitted code corresponding to the task. Thus, a coordinator may provide rapidly reconfigurable localized management of coordinated devices.

Generally described, the typical deployment cycle for tasks, or other on-demand executable code intended for a coordinated device, includes the generation of the executable code, transmission of the executable code to the coordinator, processing of the received code by the coordinator, deployment of the processed code (e.g., tasks) to a selected coordinated device for execution. During the development and testing of executable code, the deployment of the task is further followed by testing of the coordinated device during the execution of a deployed task. Generally described, however, the implementation of workflows or applications for coordinated device networks requires detailed knowledge and experience.

To address potential inefficiencies associated with networks with rendering sources, a coordinated network service that facilitates the design and implementation of a coordinated device network of IoT devices is provided. Illustratively, the coordinated network service defines modules or models for individual IoT devices or coordinated devices that specify the necessary inputs to the device, the outputs from the device and communication protocols. Via an interface, user devices can select a set of IoT devices and specify how they are connected and the decision making logic associated with communication flow. The coordinated network service can then automatically identify mapping information that implements the decision making logic and provides necessary data transformations for communications between the specified devices. The selected modules and mappings form a workflow for the coordinated device network. The coordinated network service can then generate executable code to implement the formed workflow in a coordinated device environment, such as via a coordinator or as a standalone executable.

One or more aspects of the present application will be described with regard to the implementation of specific workflows or illustrative examples, such as graphical user interfaces for collecting user input or generating results. However, such examples are illustrative in nature and should not necessarily be construed as limiting.

As will be appreciated by one of skill in the art in light of the present disclosure, the embodiments disclosed herein improves the ability of computing systems, and particularly computing systems with limited localized user interfaces, to be coordinated and managed by an external device. Specifically, the present disclosure provides a highly configurable coordinator to coordinate and manage devices within a coordinated environment in a reliable manner, while reducing or eliminating the need for communications via external or public communication networks. Thus, the embodiments disclosed herein provide more responsive control of coordinated devices (due, for example, to reduced latency of communications), as well as increased security in coordinated devices. Thus, the present disclosure represents an improvement on existing data processing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100, including one or more coordinated environments 110 in which a coordinator 114 may operate to control coordinated devices 112, as well client devices 102 that may interact with the coordinated environments 110 (e.g., to request a change in state of a coordinated device 112), and a service provider environment 120 that may assist in communications with or configuration of the coordinators 114 in various coordinated environments 110.

The coordinated environments 110, client devices, and service provider environment 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein.

While some embodiments disclosed herein may utilize known protocols, such as MQTT, accord to a standard implementation of such protocols, other embodiments may vary the implementation of such protocols. For example, standardized MQTT can utilize a "keep alive" functionality, whereby a client and broker must exchange either normal data or a specialized keep-alive message (e.g., an MQTT ping) within a threshold period of time (a "keep-alive" threshold), or the connection is assumed to be broken. However, the overhead created by specialized keep-alive messages may be undesirable within coordinated environments 112. Thus, some embodiments of the present application may implement a variable keep-alive threshold, whereby the keep-alive threshold is increased as keep-alive messages are transmitted, until an error occurs in communication. Illustratively, where a first keep-alive threshold expires, results in client transmission of a keep-alive message, and the client obtains a keep-alive response from a broker, the client may increase the keep-alive threshold for subsequent transmissions by some amount (e.g., 50%, n ms, etc.), potentially reaching a maximum amount. Where a first keep-alive threshold expires, results in client transmission of a keep-alive message, and the client does not obtain a keep-alive response from a broker, the client may decrease the keep-alive threshold for subsequent transmissions either by some amount (e.g., 50%, n ms, etc.) or to a default minimum value. Thus, as keep-alive messages are transmitted and acknowledged, the keep-alive threshold for subsequent transmissions can be increased, reducing bandwidth used to support such transmissions. These variations to the MQTT may be particularly beneficial in environments 110 with low-bandwidth or high congestion.

Each coordinated environment 110 may include a coordinator 114 and any number of coordinated devices 112, in communication via a network of the execution environment 110 (which network is not shown in FIG. 1). Because of their association within the coordinated environment 110, the coordinated devices 112 and coordinator 114 within a given environment 110 may be considered "local" to one another, in terms of communications network. For example, the coordinated devices 112 and coordinator 114 within a given environment 110 may be connected via a LAN or other localized communication network. The coordinated devices 112 and coordinator 114 may communicate with one another over such a localized communication network, in accordance with the embodiments described herein. In some instances, communications between a coordinated device 112 and coordinator 114 may be encrypted, such as via Transport Layer Security cryptographic protocol. Illustratively, a coordinator 114 may be provisioned with a security certificate that verifies a digital identify of the coordinator. The security certificate may be signed by a public certificate authority or a private certificate authority (e.g., established by the service provider environment 120).

Each coordinated device 112 can correspond to a computing device configured to communicate with the coordinator 114 to manage functionality of the coordinated device 112. In some instances, coordinated devices 112 can correspond to fully featured computing devices, such as laptops, desktops, standalone media players, etc., with robust localized user interface capabilities. In other instances, coordinated devices 112 can correspond to thin devices or embedded devices associated with another primary function, such as a device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the coordinated devices 112 may include limited local user interfaces, and be configured for remote management. In some instances, coordinated devices 112 may be stateful, and operate to alter their state in response to instructions (e.g., by turning from "off" to "on," etc.).

As described in more detail below (e.g., with respect to FIG. 2), the coordinator 114 can correspond to a computing device executing instructions to coordinate, manage, or control operation of the coordinated devices 112, without requiring that instructions transmitted to the coordinated devices 112 travel outside the coordinated environments 110 (thus increase the security of such instructions and increasing the speed of their transmission). Specifically, the coordinator 114 can include a processor and memory collectively configured to manage communications between any combination of coordinated devices 112, client devices 102, and devices of the service provider network 120. The coordinator can further be configured to enable executions of tasks, in a manner similar to an on-demand code execution environment 120 of the service provider environment 120. These tasks may implement a variety of user-defined or non-user-defined functionalities, including communicating with coordinated devices 112, client devices 102, and devices of the service provider network 120. As such, the coordinator 114 can be configured to allow for manual, automatic, or semi-automatic control of coordinated devices 112. For example, the coordinator 114 may enable a client device 102 to transmit a request to change the state of a coordinated device 112, and cause such a change in state to occur. As a further example, the coordinator 114 may enable a user to specify a criterion under which a state of a coordinated device 112 should be changed, and then automatically operate to change the state of the coordinated device 112 when the criterion is satisfied.

As will be discussed below, many functions of the coordinator 114 may be established via tasks, enabling rapid alteration of these functions as desired by a user. In some instances, such tasks (or dependencies of such tasks, such as libraries, drivers, etc.) may be provided by a user of the coordinator. In other instances, such tasks may be provided to the coordinator 114 by a service provide environment 120. For example, the service provider environment 120 may maintain a library of tasks available to coordinators 114, as well as types of coordinated devices 112 to which such tasks can apply (e.g., all devices, a specific device model, devices of a specific manufacturer, type, or function, etc.). The service provider environment 120 may then provide all or some tasks to a coordinator 114 appropriate for the coordinated devices 112 in a coordinated environment 110 of the coordinator 114, or notify a user of the availability of such tasks. In one embodiment, a user may notify the service provider environment 120 or the coordinator 114 as to the coordinated devices 112 in the coordinated environment 110. In another embodiment, the coordinator 114 may be configured to determine characteristics of coordinated devices 112 within a coordinated environment 110 based on transmissions of those devices. Illustratively, on receiving a communication from a coordinated device 112 (e.g., in response to a user-initiated pairing, based on automated transmissions, etc.), a coordinator 114 may compare a content or format of the transmission to information mapping formats or contents to different device times. Such a mapping may be maintained by the service provider environment 120, and updated based on data collected from various coordinators 114. In some instances, rather than mapping transmission to device types, a coordinator 114 may function to map transmissions to tasks appropriate for a device 112, regardless of whether the type of the device 112 is known. For example, the service provider environment 120 may collect, for an established environment 110 with one or more coordinated devices 112, data identifying a content or format of transmission of such devices 112 and the tasks utilized to manage operation of such devices 112. Thereafter, newly created coordinated environments 110 may be monitored for identical or similar transmissions, and the tasks utilize in the established environment 110 may be presented for potential use in the newly create environment 110. In still other embodiments, a coordinator 114 may utilize standardized discovery protocols, such as the Universal Plug and Play (UPnP) set of protocols, to discover devices 112 within a coordinated environment 110.

Client devices 102 may include a variety of computing devices enabling a user to communicate with the coordinated environments 110, the service provider environment 120, or both. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The service provider environment 120 may provide the client devices 102 with one or more user interfaces, command-line interfaces (CLI), application programing interfaces (API), and/or other programmatic interfaces for interacting with the service provider environment 120, such as to submit a configuration for a coordinator 114, and control deployment of that configuration, to submit code corresponding to a task to be executed on the coordinator 114 or an on-demand code execution environment 150 of the service provider environment 120, to view logging or monitoring information related to coordinators 114, etc. Similarly, the coordinator 114 may provide the client devices 102 with one or more user interfaces, command-line interfaces (CLI), application programing interfaces (API), or other programmatic interfaces for interacting with the coordinator 114, such as to read a state of a coordinated device 112, request a change in state of a coordinated device 112, request that the coordinator 114 cause execution of a task, etc. Although one or more embodiments may be described herein as using a user interface, it should be appreciated that such embodiments may, additionally or alternatively, use any CLIs, APIs, or other programmatic interfaces.

The service provider environment 120 can include a number of elements to enable configuration of, management of, and communications with coordinators 114. Specifically, the service provider environment 120 includes a management and deployment service 130 to enable registration of coordinators 114 with the service provider environment 120 and configuration of such coordinators 114, a device shadow service 140 to enable robust changes to state of coordinators 114 and coordinated devices 112, and an on-demand code execution environment 150 providing on-demand, dynamic execution of tasks, as well as deployment and provisioning of tasks on coordinators 114.

As shown in FIG. 1, the management and deployment service 130 includes a client and data interface 132 and a configuration data store 134 that may operate collectively to enable registration of a coordinator 114 with the management and deployment service 130, generation of configurations for the coordinator 114, and transmission of configuration data to the coordinator 114. Illustratively, the client and data interface 132 may provide one or more user interfaces (e.g., APIs, CLIs, GUIs, etc.) through which a user, via a client device 102, may generate or submit a configuration of a coordinator 114 for storage in the configuration data store 134. The client and data interface 132 may further provide one or more interfaces through which a coordinator 114 may obtain the configuration, such that the coordinator 114 is reconfigured according to the obtained configuration. The configuration data store 134 can correspond to any persistent or substantially persistent data store, such as a hard drive (HDD), a solid state drive (SDD), network attached storage (NAS), a tape drive, or any combination thereof.

The device shadow service 140 can include elements enabling a "shadow state" of a device, such as a coordinator 114 or a coordinated device 112, to be created, maintained, read, altered, or deleted. As discussed above, a shadow state may correspond to data representing a desired state of a correspond device, which may or may not mirror a current state of the device. For example, with respect to a coordinator 114, a shadow state may include a desired configuration version for the coordinator 114. With respect to a coordinated device 112, a shadow state may include a desired state of the coordinated device 112 (e.g., on or off for a switch or bulb, locked or unlocked for a lock, a desired temperature for a thermostat, etc.). The device shadow service 140 may enable users, via client devices 102, or other entities to read from or modify a shadow state for a device, and may further interact with that device to synchronize the device to the shadow state. Illustratively, the device shadow service 140 may include an interface 142 (which may include, e.g., APIs, CLIs, GUIs, etc.) through which requests to read from, write to, create or delete a shadow state may be received, as well as a shadow data store 144 configured to store the shadow states. The shadow data store 134 can correspond to any persistent or substantially persistent data store, such as a hard drive (HDD), a solid state drive (SDD), network attached storage (NAS), a tape drive, or any combination thereof. Further details regarding the device shadow service 140 can be found within the '700 application, incorporated by reference above. The device shadow service 140 may be optional and omitted from the service provider environment 120.

The on-demand code execution environment 150 can include a number of devices providing on-demand execution of tasks (e.g., portable code segments). Specifically, the on-demand code execution environment 150 can include a frontend 152, through which users, via client device 102, may submit tasks to the on-demand code execution environment 150 and call for execution of tasks on the on-demand code execution environment 150. Such tasks may be stored, for example, in a task data store 154, which can correspond to any persistent or substantially persistent data store, such as a hard drive (HDD), a solid state drive (SDD), network attached storage (NAS), a tape drive, or any combination thereof. While not shown in FIG. 1, the on-demand code execution system 150 can include a variety of additional components to enable execution of tasks, such as a number of execution environments (e.g., containers or virtual machines executing on physical host devices of the on-demand code execution environment 150), a worker manager to manage such execution environments, and a warming pool manager to assist in making execution environments available to the worker manager on a rapid basis (e.g., under 10 ms). Further details regarding the on-demand code execution environment can be found within the '556 patent, incorporated by reference above.

As noted above, tasks may be utilized both at the on-demand code execution environment 150 and at coordinators 114. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 150 or a coordinator 114 in a variety of manners. In one embodiment, a client device 102 or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, a network-accessible storage service, or the task data store 154) prior to the request being received by the coordinator 114 or the on-demand code execution system 150. A request interface of the coordinator 114 or the on-demand code execution system 150 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to a coordinator 114 or the on-demand code execution system 150 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, or the computing resources (e.g., memory, etc.) to be reserved for executing the program code. For example, the program code of a task may be provided with the call, previously uploaded by the user, provided by the coordinator 114 or the on-demand code execution system 150 (e.g., standard routines), and/or provided by third parties. In some embodiments, such resource-level constraints (e.g., how much memory is to be allocated for executing a particular user code) are specified for the particular task, and may not vary over each execution of the task. In such cases, the coordinator 140 or the on-demand code execution system 150 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the coordinator 114 or the on-demand code execution system 150 may inspect the call and look for the flag or the header, and if it is present, the coordinator 114 or the on-demand code execution system 150 may modify the behavior (e.g., logging facilities) of the execution environment in which the task is executed, and cause the output data to be provided back to the user. In some embodiments, the behavior/mode indicators are added to the call by the user interface provided to the user by the coordinator 114 or the on-demand code execution system 150. Other features such as source code profiling, remote debugging, etc. may also be enabled or disabled based on the indication provided in a call. Still further as discussed above, in certain embodiments, the call may specify a file location and expected inputs/outputs from the file location that correspond to access of resources local to specific coordinated devices 112 that will execute the task.

The service provider environment 120 is depicted in FIG. 1 as operating in a distributed computing environment including several computer systems that are interconnected using one or more computer networks (not shown in FIG. 1). The service provider environment 120 could also operate within a computing environment having a fewer or greater number of devices than are illustrated in FIG. 1. Thus, the depiction of the service provider environment 120 in FIG. 1 should be taken as illustrative and not limiting to the present disclosure. For example, the service provider environment 120 or various constituents thereof could implement various Web services components, hosted or "cloud" computing environments, and/or peer to peer network configurations to implement at least a portion of the processes described herein.

Further, the service provider environment 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
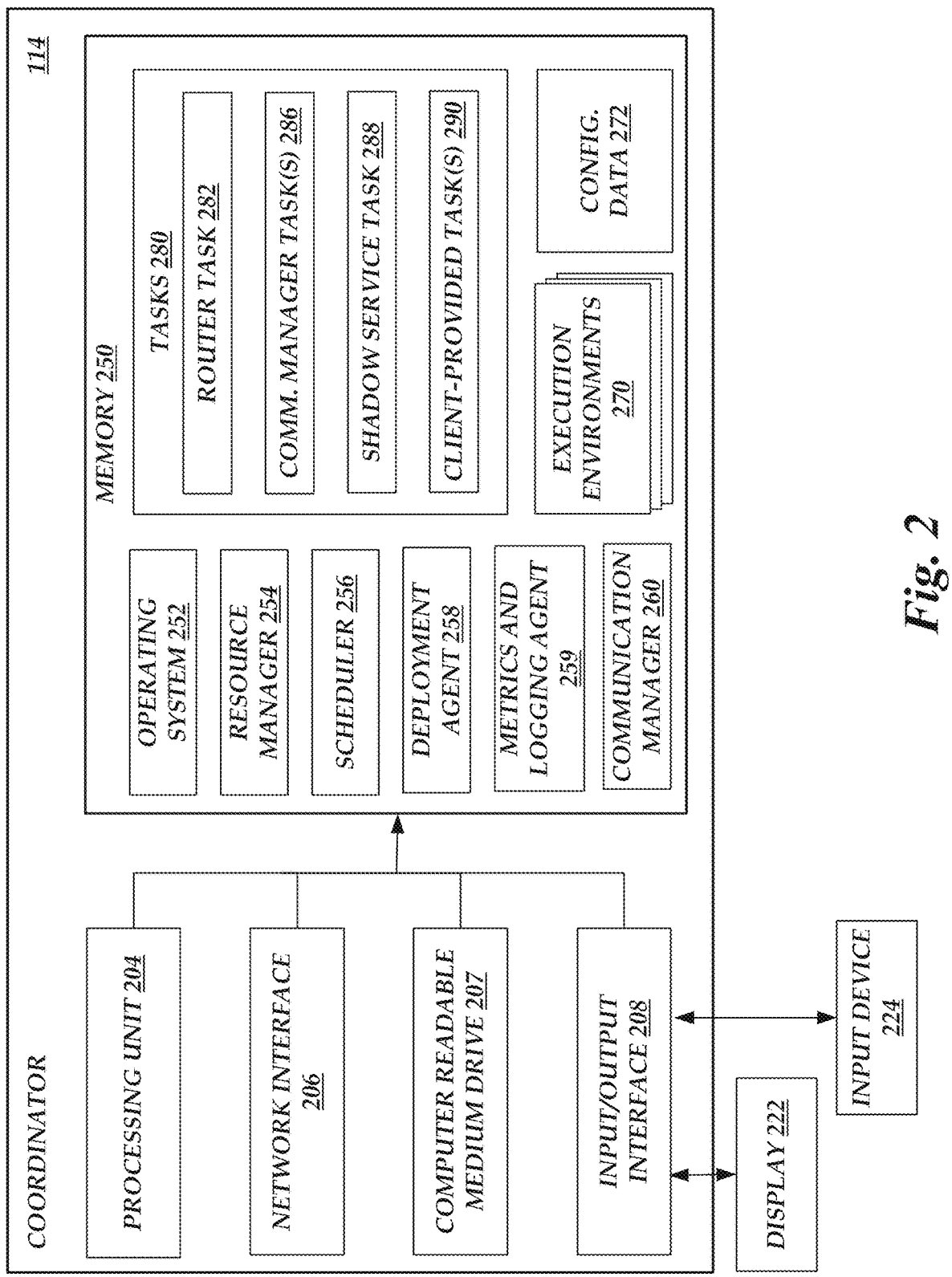
FIG. 2 depicts a general architecture of a computing device providing a coordinator of FIG. 1.

FIG. 2 depicts a general architecture of a computing system (referenced as coordinator 114) that manages coordinated devices 112 within a given coordinated environment 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The coordinator 114 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the coordinator 114 includes a processing unit 204, a network interface 206, a computer readable medium drive 207, and an input/output device interface 208, all of which may communicate with one another by way of a communication bus. The network interface 206 may provide connectivity to one or more networks or computing systems. The processing unit 204 may thus receive information and instructions from other computing systems or services via the network 104. The processing unit 204 may also communicate to and from memory 250 and further provide output information for additional resources via the input/output device interface 208. The input/output device interface 208 may also accept input from the additional resources.

The memory 250 may contain computer program instructions (grouped as modules in some embodiments) that the processing unit 204 executes in order to implement one or more aspects of the present disclosure. The memory 250 generally includes random access memory (RAM), read only memory (ROM) and/or other persistent, auxiliary or non-transitory computer readable media. The memory 250 may store an operating system 252 that provides computer program instructions for use by the processing unit 204 in the general administration and operation of the coordinator 114. The memory 250 may further include computer program instructions and other information for implementing aspects of the present disclosure. For example, in one embodiment, the memory 250 includes a process manager 254, a scheduler 256, a deployment agent 258, and a communication manager 260.

The scheduler 256 and deployment agent 258 may be executed by the processing unit 204 to select tasks for execution by the processing unit 204, and to manage such task executions. Specifically, the scheduler 256 may include instructions to select a tasks for execution at given points in time and to suspend execution of tasks (e.g., under instances of constrained resources at the coordinator 114). The deployment agent 258 may include instructions to select an appropriate execution environment 270 in which to execute a task, to provision that execution environment 270 with appropriate access to resources needed during the task execution, and to cause execution of the task within the execution environment 270. An execution environment 270, as used herein, refers to a logical portion of memory 250 in which to execute a task. In one embodiment, execution environments 270 are programmatically separated, such that execution of code in a first execution environment 270 is prohibited from modifying memory associated with another execution environment 270. Illustratively, an execution environment 270 may correspond to a "container," operating-system-level virtualization environment, or "sand box" environment, such as a "chroot jail" or a Python virtual environment "virtualenv." In other instances, an execution environment 270 may correspond to a virtual machine environment (e.g., a JAVA virtual machine, a virtualized hardware device with distinct operating system, etc.). In still other instances, an execution environment 270 may be a memory space allocated to an execution of a task, without necessarily utilizing virtualization.

Communications between tasks executing on the coordinator, as well as between the coordinator 114 and other devices (e.g., client devices 102 and coordinated devices 112) may be facilitated by the communication manager 260. Specifically, the communication manager 260 may be configured to obtain messages directed to the coordinator 114 and forward the message to the appropriate destination. For example, the communication manager 260 may route messages between any combination of tasks, coordinated devices 112, client devices 102, and devices of the service provider execution environment 120.

To enable gathering of information regarding operation of the coordinator 114, the memory 250 further includes a metrics and logging agent 259, corresponding to code executable by the coordinator 114 to monitor operation of the coordinator 114, such as how tasks are executed at the coordinator 114, and to report information regarding such operation. The information may include, for example, execution times of tasks on the coordinator 114, as well as information regarding such executions (e.g., compute resources used, whether the execution resulted in an error, etc.). In some instances, the metrics and logging agent 259 may store this information locally, such as in the memory 250, to enable a user to obtain the information. In other instances, the metrics and logging agent 259 agent may store the information remotely, such as at the service provider environment 150. The metrics and logging agent 259 may also implement additional functionality with respect to monitoring operation of the coordinator 114, such as transmitting health check data from the coordinator 114 to the service provider environment 150.

Tasks executed by the coordinator 114 are shown as logically grouped within the tasks memory space 280, which may correspond to a logical unit of memory 250 configured to store the code corresponding to each task. As shown in FIG. 2, the tasks memory space 280 can include a number of tasks executable by the processing unit 204 to implement functionalities of the coordinator 114, including a router task 282, one or more communication manager tasks 286, a shadow service task 288, and one or more client-provided tasks 290.

The router task 282 may correspond to a portion of code executable to assist in the routing of messages within, to, and from the coordinator 114. In one embodiment, the router task 282 implements an "event flow table" to determine appropriate destinations for a message or other indications of events received at the coordinator 114. For example, the communication manager 260 may forward messages obtained at the coordinator 114 (e.g., due to generation by a task execution or reception at the input/output interface 208) to the router task 282, which may utilize the event flow table to determine that messages addressed to a certain identifier should be routed to a given task, a given client device 102, or a given coordinated device 102. In some instances, the event flow table may further be utilized to specify a manner of handling messages of a give type. For example, the event flow table may specify that messages or event data originating at a certain task or coordinated device 112 should be transmitted to another task or coordinated device 112, logged at the coordinator 114, disallowed, result in a new execution of a task, etc. The event flow table may further indicate that a message meeting specified criteria (e.g., addressed to a given identifier, including a specific flag, etc.) should be transmitted to the service provider environment 120 (e.g., to the device shadow service 140 or the on-demand code execution system 150). In one embodiment, the event flow table may utilize "topics" as identifiers, such that messages associated with a particular topic are transmitted according to a routing specified for that topic. The event flow table may further include information for how to route messages based on a source of those messages. For example, a message addressed to a given topic may be routed differently, based on whether the message is received from a first task, a second task, a first coordinated device 112, etc. By utilization of an event flow table, router task 282 can enable messages to be handled in different manners, without a change in the operation of a sender of such a message (e.g., without rewriting code for a task that generated the message, without modifying the software of a coordinated device 112 that generated the message, etc.).

The communication manager tasks 286 may enable communications between the coordinator 114 and a number of different external devices (e.g., coordinated devices 102) according to a protocol of such communications. For example, a first communication manager task 286 may be configured to manage communications using a BLUETOOTH™ protocol, a second communication manager may be configured to manage communications using an HTTP protocol, etc. In some instances, multiple communication manager tasks 286 may work collectively to implement communications. For example, a first communication manager task 286 may enable communications via the TCP protocol, while a second communication manager task 286 may enable communications via the MQTT protocol (which utilizes the TCP protocol and thus may utilize a first communication manager task 286). Because different communication manager tasks 286 can vary the ability of the coordinator 114 to communicate via different protocols, and because the tasks of the coordinator 114 may be altered via reconfiguration of the coordinator 114, the coordinator 114 can be rapidly reconfigured to utilize a variety of different communication protocols.

The shadow service task 288 can facilitate management and interaction with device shadows maintained at the coordinator 114. Illustratively, the shadow service task 288 can implement functionality similar to that provided by the device shadow service 140 locally to the coordinator 114. Accordingly, the shadow service task 288 can maintain a shadow state (data representing a desired state) of a coordinated device 112, and allow for reading to or writing to such data. The shadow service task 288 can further enable synchronization of a coordinated device 112 with the device shadow for that device. Accordingly, by modifying a device shadow for a coordinated device 112, the state of the coordinated device 112 can be altered. By reading the device shadow for the coordinated device 112, the state of the coordinated device 112 can be determined. In some instances, the shadow service task 288 may further coordinate with another device shadow for a given device, such as a device shadow maintained by the device shadow service 140. For example, the shadow service task 288 may synchronize a local device shadow with a device shadow stored at the device shadow service 140, resolve conflicts between the local device shadow and the device shadow stored at the device shadow service 140, etc.

In addition to the tasks described above (each of which may illustratively be provided by an entity associated with the service provider environment 120), the tasks memory space 280 may include any number of client-provided tasks 290, which may correspond to executable code generated by a client device 102 and submitted to the service provider environment 120 for deployment to a coordinator 114. As such, functionalities provided by the client-provided tasks 290 may vary according to the desires of a submitting user. In some instances, the client-provided tasks 290 may be written in a coding language for which the memory 250 includes a language runtime. For example, where the coordinator 114 supports language such as node.js, Go, JAVA, and Python, the client-provided tasks 290 may include executable code written in any of those languages.

In addition, the memory 250 includes a configuration data portion 272, representing a logical portion of the memory 250 in which configuration data of the coordinator 114 is stored. The configuration data may include, for example, a current deployment version of the coordinator 114, data stored by the tasks of the task memory space 280, or other data used in the operation of the coordinator 114.

To enable configuration (and reconfiguration) of the coordinator 114, the memory 250 further includes a deployment agent 258. The deployment agent 258 can correspond to code executable to register a coordinator with the service provider environment 120, to determine a desired configuration of the coordinator 114, and in instances where a current configuration of the coordinator 114 does not match a desired configuration, to obtain configuration data for the coordinator 114 and modify the memory 250 to implement the desired configuration.

Figure 3A:
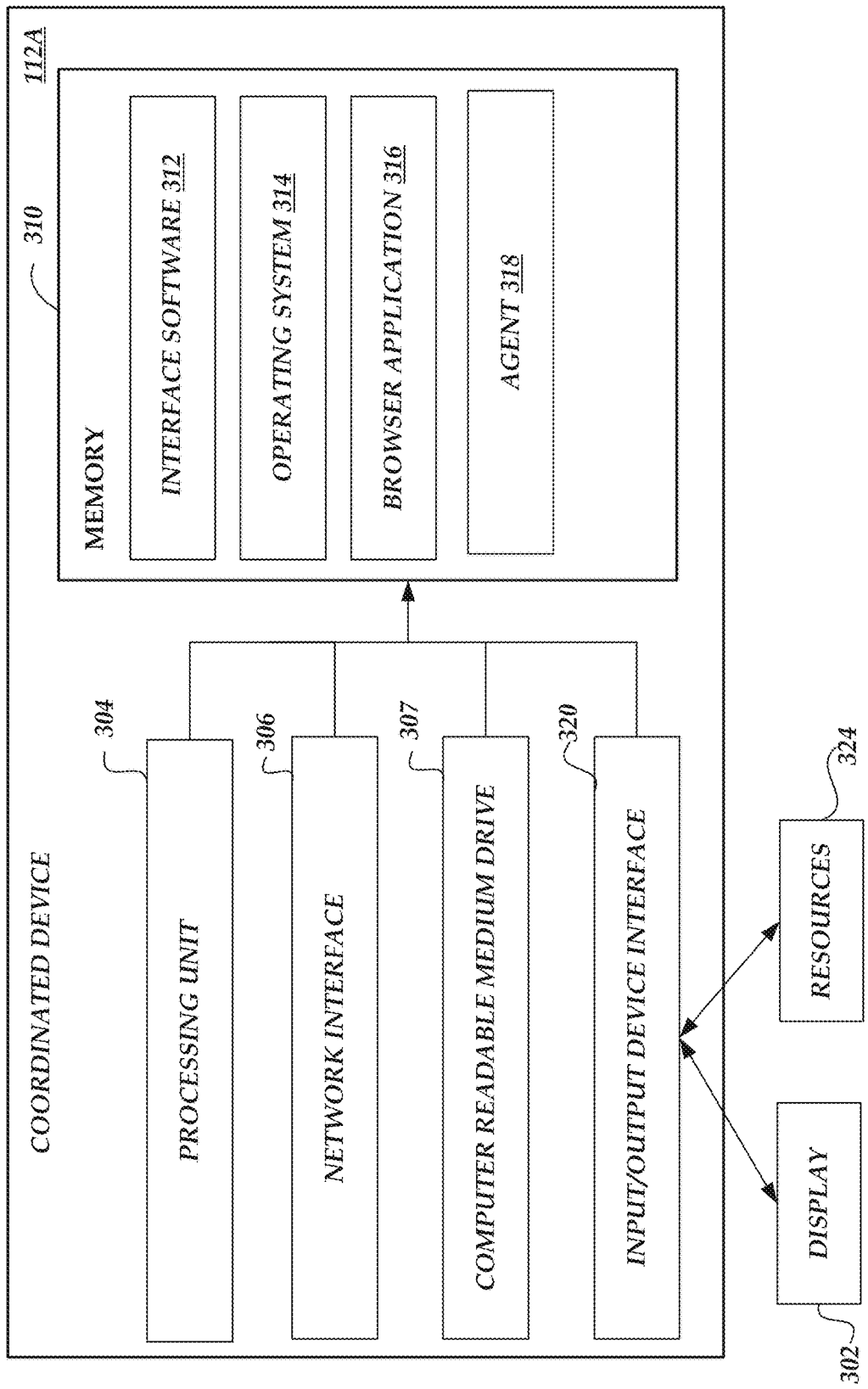
FIGS. 3A and 3B depict general architectures of coordinated devices managed by the coordinator of FIG. 1.

FIG. 3A depicts one embodiment of an architecture of an illustrative coordinated device 112A in accordance with the present application. The general architecture of the coordinated device 112A depicted in FIG. 3A includes an arrangement of computer hardware and software components that may be used to implement aspects of the present disclosure. As illustrated, the coordinated device 112A includes a processing unit 304, a network interface 306, a computer readable medium drive 307, an input/output device interface 320, an optional display 302, and an input device 324, all of which may communicate with one another by way of a communication bus. Illustratively, the coordinated device 112A may have more limited functionality and components, such as inputs or outputs, as embedded devices. Still further, in some embodiments, a computing device may implement the functionality associated with the coordinator 114 and coordinated device 112.

The network interface 306 may provide connectivity to one or more networks or computing systems, such as the network 104 of FIG. 1. The processing unit 304 may thus receive information and instructions from other computing systems or services via a network. As will be described in greater detail below, individual coordinated devices 112 may be configured to receive a set of inputs, such as specific types of data required to implement one or more functions. For example, a coordinated device 112 corresponding to a badge reader, would be configured to receive a badge number encoded as a bar code. Similarly, individual coordinated devices 112 may be configured to generate a set of outputs, such as specific types of data resulting from the implementation of one or more function. For example, a coordinated device corresponding to a temperature sensor could be configured to generate data indicative of a measured temperature or a binary indication of whether a temperature threshold had been exceeded. Still further, individual coordinated devices may be configured with a set of interfaces or communication protocols that establish formats and specific protocols receiving or transmitting communications. For example, a coordinated device 112 may be configured to receive communications in accordance with any of the protocols identified previously, such as MQTT, as well with specific APIs that identify the order and format for data. Additionally, coordinated devices 112 can also be configured with regard to additional security protocols, such as encryption, compression protocols, or other protocols related to the exchange of information between coordinated devices 112 (or other components).

The processing unit 304 may also communicate to and from memory 310 and further provide output information for an optional display 302 via the input/output device interface 320. The input/output device interface 320 may also accept input from local resources 324, such as a specialized processor (e.g., graphics processing units), memory, optimized chipsets, etc. In some embodiments, the coordinated device 112A may include more (or fewer) components than those shown in FIG. 3A. For example, some embodiments of the coordinated device 112 may omit the display 302 and input device 324, while providing input/output capabilities through one or more alternative communication channel (e.g., via the network interface 306).

The memory 310 may include computer program instructions that the processing unit 204 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the coordinated device 112A. The memory 310 may further include computer program instructions and other information for implementing aspects of the present disclosure. For example, in one embodiment, the memory 310 includes a browser application 316 for accessing content. Illustratively, the browser application 316 may encompass a full software browser application, portions of a browser application or simply be an interface software application (or executable instructions) that provide for data connectivity. In some embodiments, the memory 310 can further include an agent software application 318 for establishing a communication channel with the service provider environment 310 to facilitate interaction with the local resources 324. The agent software application 318 may be implemented in combination with the browser software application 316, in lieu of the browser software application 316 or separately. In some testing environments, as discussed above, the agent software application 318 may be omitted.

Figure 3B:
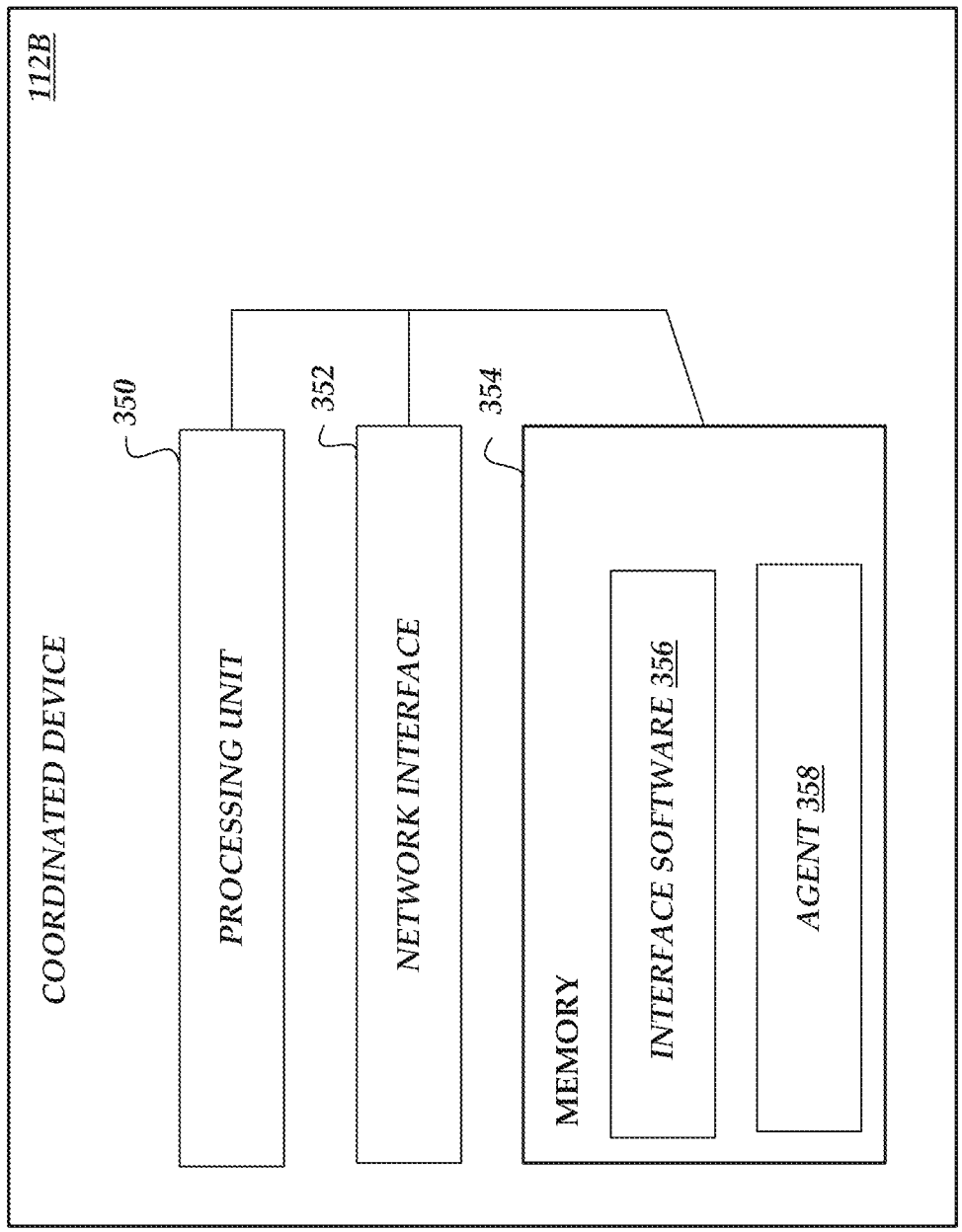

FIG. 3B depicts one embodiment of an alternative architecture of an illustrative coordinated device 112B in accordance with the present application. The general architecture of the coordinated device 112B depicted in FIG. 3B includes an arrangement of computer hardware and software components that may be used to implement aspects of the present disclosure. However, coordinated device 112B may be associated with a reduced of components that may limit the computing functionality and operation of the coordinated device 112B. As illustrated, the coordinated device 112B includes a processing unit 350 and a network interface 352 that communicate with a communication bus. Unlike coordinated device 112B of FIG. 3A, the coordinated device 112B may not have a computer readable medium drive, an optional display, or an input device. However, for purposes of the present application, the coordinated device 112B will likely have some local resource that can be accessed during the execution of a task.

The network interface 352 may provide connectivity to one or more networks or computing systems, such as the network 104 of FIG. 1. The processing unit 350 may thus receive information and instructions from other computing systems or services via a network. As will be described in greater detail below, individual coordinated devices 112 may be configured to receive a set of inputs, such as specific types of data required to implement one or more functions. For example, a coordinated device 112 corresponding to a thermostat, may be configured to receive temperature settings or time settings for adjusting environmental controls. Similarly, individual coordinated devices 112 may be configured to generate a set of outputs, such as specific types of data resulting from the implementation of one or more function. For example, a coordinated device corresponding to a motion sensor could be configured to generate data indicative of a binary indication of whether a threshold amount of motion had been detected. Still further, individual coordinated devices may be configured with a set of interfaces or communication protocols that establish formats and specific protocols receiving or transmitting communications. For example, a coordinated device 112 may be configured to receive communications in accordance with any of the protocols identified previously, such as TCP, as well with specific APIs that identify the order and format for data. Additionally, coordinated devices 112 can also be configured with regard to additional security protocols, such as encryption, compression protocols, or other protocols related to the exchange of information between coordinated devices 112 (or other components).

The memory 354 may include computer program instructions that the processing unit 350 executes in order to implement one or more embodiments. The memory 354 generally includes RAM, ROM or other persistent or non-transitory memory. In this embodiment, the memory 354 may store necessarily store a full operating system that provides computer program instructions for use by the processing unit 350 in the general administration and operation of the coordinated device 112B. Rather, in one embodiment, the memory 354 includes an interface software component 356 for accessing receiving and processing instructions. In some embodiments, the memory 310 can further include an agent software application 358 for establishing a communication channel with the service provider environment 310 to facilitate interaction with the local resources 324. The agent software application 358 may be implemented in combination with the interface software application 356, in lieu of the browser software application 316 or separately. In some testing environments, as discussed above, the agent software application 318 may be omitted.

Figure 4:
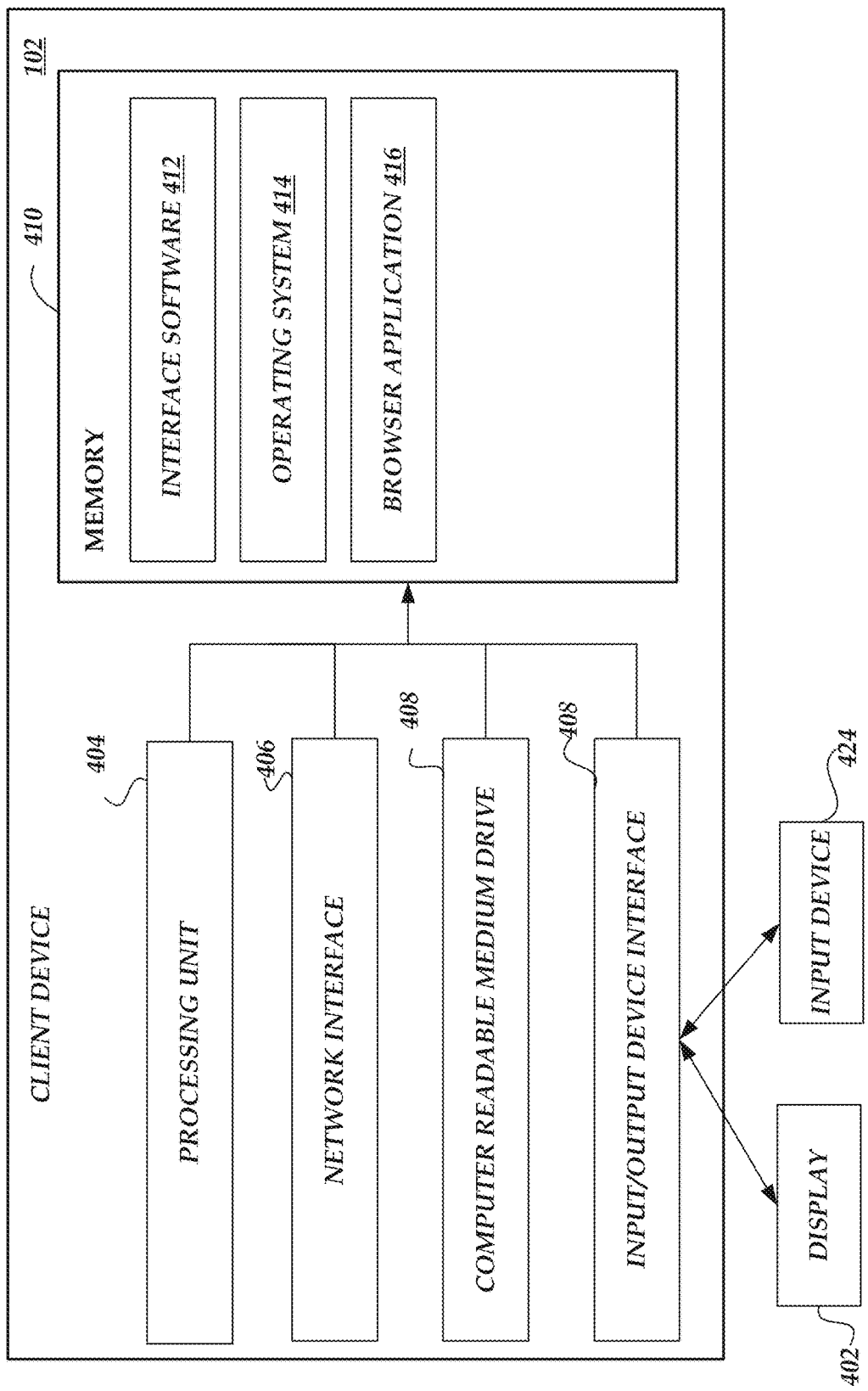
FIG. 4 depicts a general architecture of client device that may be utilized to generate and submit workflow definitions for a coordinated environment.

FIG. 4 depicts one embodiment of an architecture of an illustrative client device 102 in accordance with the present application. The general architecture of the client device 102 depicted in FIG. 4 includes an arrangement of computer hardware and software components that may be used to implement aspects of the present disclosure. As illustrated, the client device 102 includes a processing unit 404, a network interface 406, a computer readable medium drive 407, an input/output device interface 420, an optional display 402, and an input device 424, all of which may communicate with one another by way of a communication bus.

The network interface 406 may provide connectivity to one or more networks or computing systems, such as the network 104 of FIG. 1. The processing unit 404 may thus receive information and instructions from other computing systems or services via a network. The processing unit 404 may also communicate to and from memory 410 and further provide output information for an optional display 402 via the input/output device interface 420. The input/output device interface 420 may also accept input from the optional input device 424, such as a keyboard, mouse, digital pen, etc. In some embodiments, the client device 102 may include more (or fewer) components than those shown in FIG. 4. For example, some embodiments of the coordinated device 112 may omit the display 402 and input device 424, while providing input/output capabilities through one or more alternative communication channel (e.g., via the network interface 406). Additionally, the client device 102 may omit the input and output interface 420 altogether as well.

The memory 410 may include computer program instructions that the processing unit 204 executes in order to implement one or more embodiments. The memory 410 generally includes RAM, ROM or other persistent or non-transitory memory. The memory 410 may store an operating system 414 that provides computer program instructions for use by the processing unit 404 in the general administration and operation of the client device 102. The memory 410 may further include computer program instructions and other information for implementing aspects of the present disclosure. For example, in one embodiment, the memory 410 includes a browser application 416 for accessing content. Illustratively, the browser application 416 may encompass a full software browser application, portions of a browser application or simply be a software application (or executable instructions) that provide for data connectivity.

Figure 5:
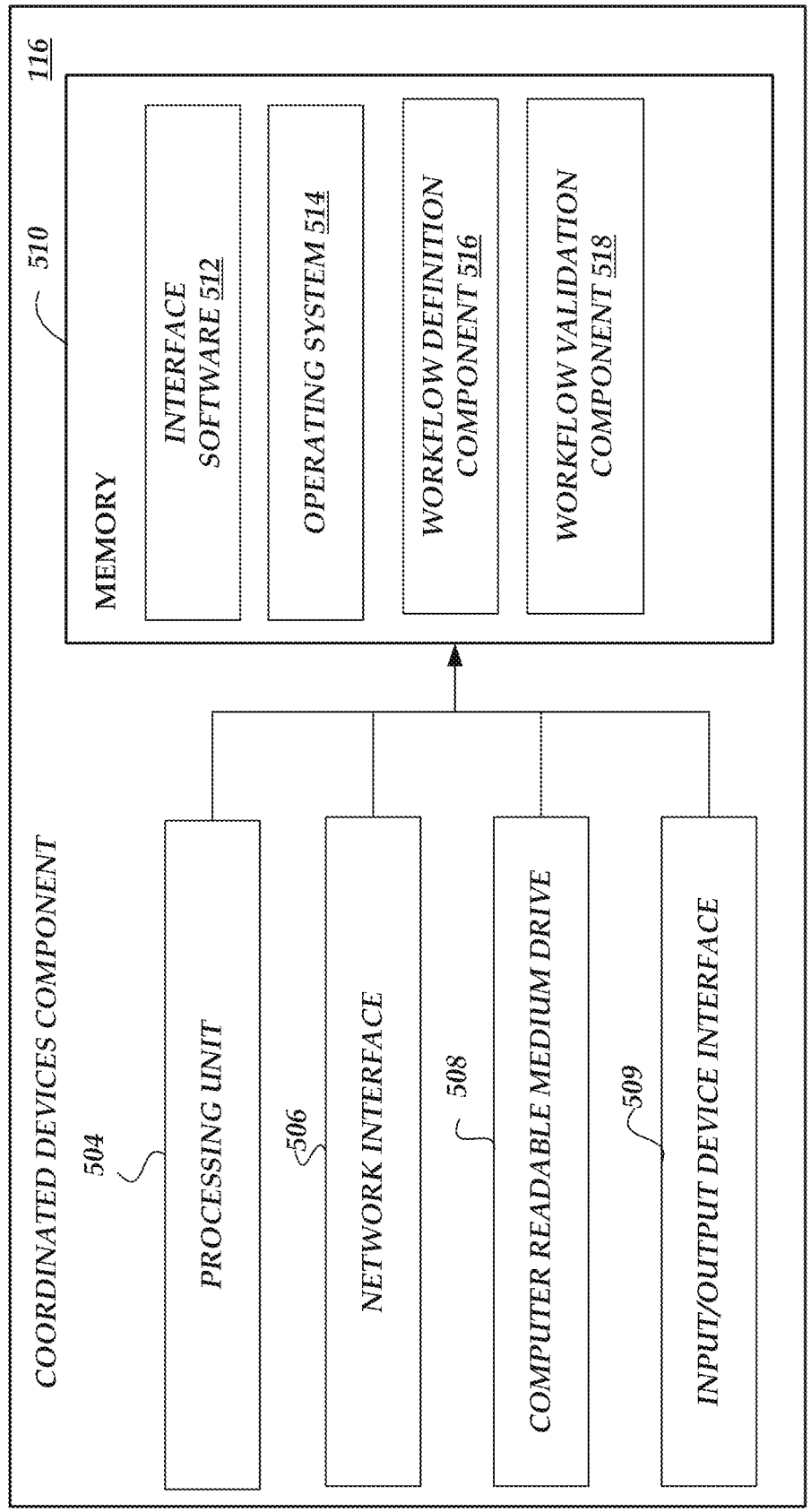
FIG. 5 is a block diagram of the environment of FIG. 1 illustrating an embodiment for a coordinated devices component implementing one or more aspects of the present application.

FIG. 5 depicts one embodiment of an architecture of an illustrative computing device for implementing various aspects of the coordinated devices component 116 in accordance with aspects of the present application. The coordinated devices component 116 can be a part of the instantiation of virtual machine instances associated with the rendering resources 106 (e.g., the pool of rendering resources). Alternatively, the computing device may a stand-alone device independent of the rendering resources 106.

The general architecture of the c coordinated devices component 116 depicted in FIG. 5 includes an arrangement of computer hardware and software components that may be used to implement aspects of the present disclosure. As illustrated, the computing device 500 includes a processing unit 504, a network interface 506, a computer readable medium drive 508, an input/output device interface 509, all of which may communicate with one another by way of a communication bus. The components of the computing device 500 may be physical hardware components or implemented in a virtualized environment.

The network interface 506 may provide connectivity to one or more networks or computing systems, such as the network of FIG. 1. The processing unit 504 may thus receive information and instructions from other computing systems or services via a network. The processing unit 504 may also communicate to and from memory 510 and further provide output information. In some embodiments, the computing device 500 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the computing device 108. The memory 510 may further include computer program instructions and other information for implementing aspects of the present disclosure. For example, in one embodiment, the memory 510 includes interface software 512 for receiving and processing requests from user devices 102 or transmitting processed results. Memory 510 includes a workflow definition component 516 for processing workflow definition information and generating mapping based on the workflow definitions as described herein. The memory 510 further includes a workflow validation component 518 for the testing of the generated workflow, such as via simulation, as described herein.

As specified above, in one embodiment, the computing device 116 illustrated in FIG. 5 can be implemented as physical computing devices or virtualized computing devices in a computing network. In another embodiment, the computing device 116 may be implemented as logical components in a virtual computing network in which the functionality of the computing device 116 is implemented by an underlying substrate network of physical computing devices. Thus, aspects of the present application should not be limited to interpretation requiring a physical, virtual or logical embodiment unless specifically indicated as such.

Figure 6:
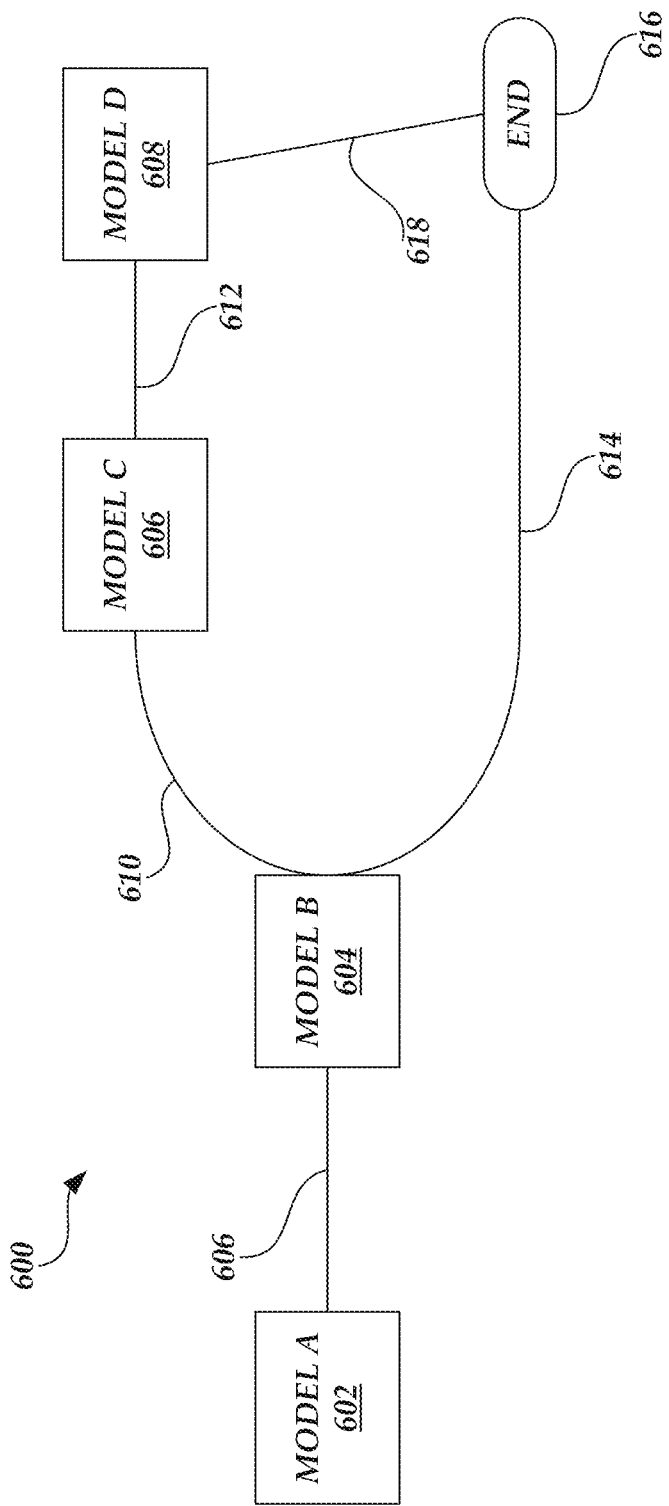
FIG. 6 is a block diagram illustrating the formation of workflow definition.

With reference now to FIG. 6, an illustrative workflow definition 600 will be described. Illustratively, the user devices 102 can generate one or more user interfaces, such as graphical user interfaces, that allow for the specification of a workflow definition by user. For example, the graphical user interface can allow a user to selection a plurality of coordinated devices, such as via a drop down menu or library. The graphical user interface can then allow the user to select a communication path between the coordinated devices, such as via drawing of communication lines/paths via an input device. Still further, the graphical user interface can then allow the user to select or specify communication decision making logic. The communication decision making logic can include criteria for determining when communications should occur, such as threshold values. The communication making logic can further include branching information and associated criteria for specifying two or more branches for a communication path. Illustratively, the communication making logic can be specified as binary logic (e.g., yes or no), branching logic based on thresholds or ranges, and can include additional or supplemental criteria for use in the evaluation process. The actual implementation of the graphical interface can be customized according to preferences/requirements provided by the user device 102 or a system administrator. The resulting specification can be sent to the coordinated devices management service 116 via an interface. Accordingly, the block diagrams of FIG. 6 can be used to illustrate how a graphical interface may depict a workflow definition.

For purposes of illustration, the workflow definition 600 includes a specification for four coordinated devices 112 in a coordinated device network 112. Each coordinated device 112 is represented by a module or model that represents the implementation of the coordinated device in the workflow, namely Model A 602, Model B 604, Model C 606, and Model D 608. Illustratively, the coordinated devices management service 116 can maintain a library of models or modules that define for individual coordinated devices a set of inputs for the coordinated device, a set of outputs for the coordinated device and a corresponding set of interfaces or set of protocols utilized in the communication. Illustratively, the set of inputs can correspond to a variety of data types, value ranges, mandatory data fields, optional data fields, and can vary by the function to be implemented by the coordinated device 112, including setting the function to be performed. The set of outputs can correspond to a variety of data types and value ranges and can further vary based on the function implemented by the individual coordinated device. The set of interfaces or communication protocols that establish formats and specific protocols receiving or transmitting communications and the APIs or other formats for which the inputs/outputs will be specified. The module may be specific individual coordinated devices 112 or alternatively a grouping of coordinated devices 112. The previously stored modules may be obtained based on a manual definition by a system administrator, previous implementations of coordinated device workflows or via third party providers, such as the manufacturer or a module marketplace provider. If a module is not available for a specified coordinated device, the coordinated devices management service 116 obtains a manual definition of a module. For example, the coordinated devices management service 116 can cause the user device 102 to generate one or more menus or graphical menus that allow users or system administrators to specify the set of inputs, set of outputs or communication protocols/interfaces. The user menus can also allow for suggestions or default settings based on manufacturer, type of device, type of interaction, or generic settings.

The workflow definition also includes a specification of communication paths between the selected models/modules. The communication path can specify a one to one or one to many communication flow and communication decision logic that identifies criteria for allowing communications to be generated from a coordinated device, to allow generated communications to pass between coordinated devices 112 or whether additional or supplemental information will be included in the communications (e.g., security keys, personal identifiers, etc.). As illustrated in FIG. 6, there are five communication paths 606, 610, 612 and 618. Communication paths 610 and 614 represent branching paths and the coordinated devices management service 116 would obtain the communication decision logic to determine which path to route communications. The workflow definition 600 also includes a stop or termination indicator 616.

Illustratively, the coordinated devices management service 116 automatically identifies mappings based on the specified communication path. Illustratively, the mappings represent individual transformations of communications between each communication connection between two (or more) coordinated devices. Each individual mapping is based on the specified outputs from a first coordinated device to the inputs of a second coordinated device and further in accordance with the specified communication protocol for the first and second coordinated device. As described above, the mapping can include a specification of additional information required to allow for the communication between the two coordinated devices or based on the communication decision making logic (e.g., a specific of a priority field or importance field based on evaluation of criteria independent of the coordinated devices). The combination of mappings and communication decision making logic illustratively form the workflow definition that will result in the generation of executable code as described herein. For example, the workflow illustrated in FIG. 6 could correspond to a security workflow in which the coordinated devices 112 are configured to facilitate access control in a physical structure. In another example, the workflow illustrated in FIG. 6 could correspond to a climate control workflow in which the coordinated devices 112 are configured to facilitate management of climate in one or more regions of a physical structure. In yet another example, the workflow illustrated in FIG. 6 could correspond to a data flow workflow in which coordinated devices 112 are configured to collect, process and transmit different types of data. One skilled in the relevant art will appreciate, however, that these examples are illustrative in nature and does not correspond to an identification of all the possible workflows or variations thereof.

Figure 7:
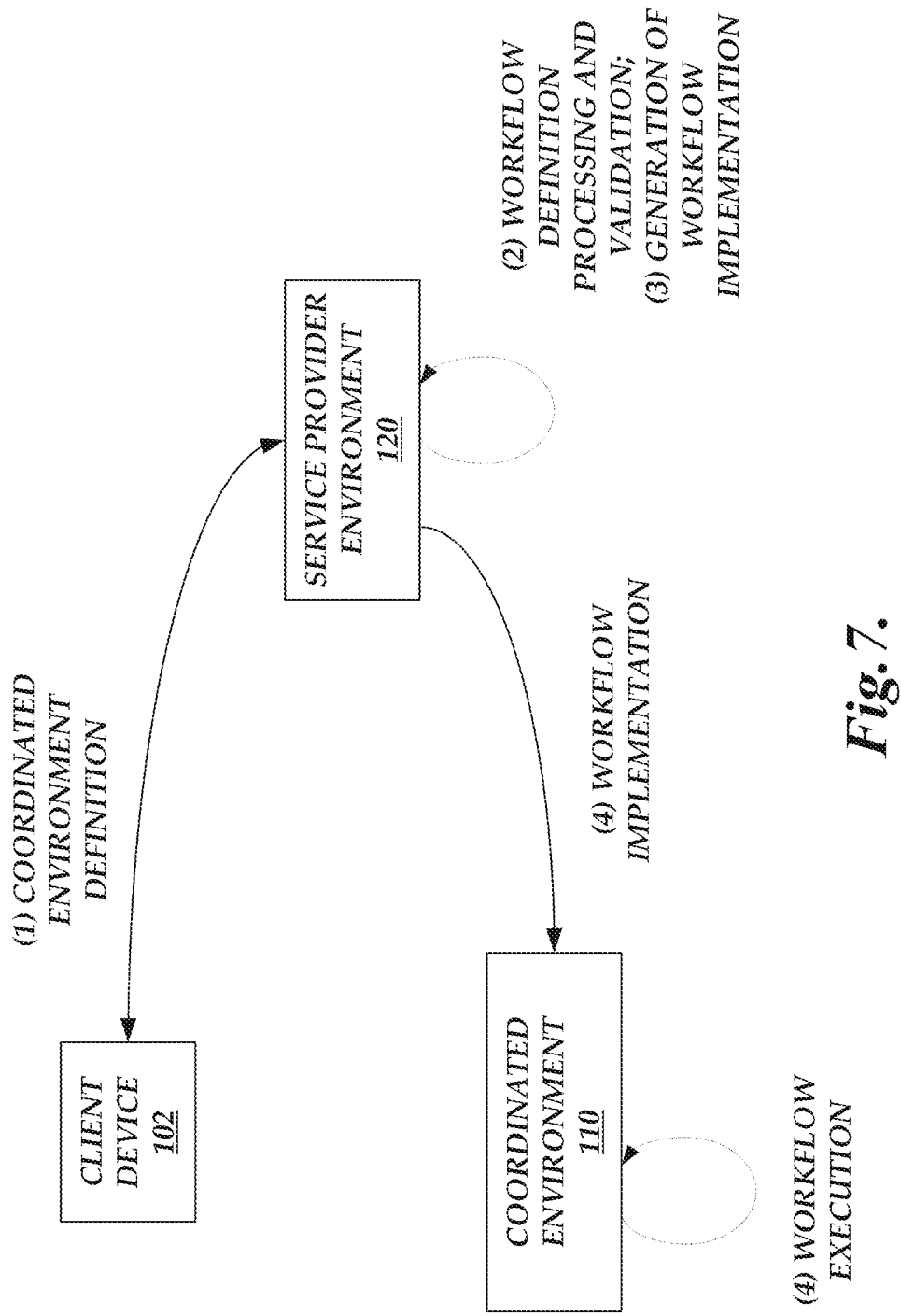
FIG. 7 is a block diagram of the illustrative environment of FIG. 1 illustrating the specification and implementation of a workflow in a coordinated environment.

Turning now to FIG. 7, illustrative embodiments for the processing of the specification of a workflow for a coordinated device environment 110 will be described. At (1), the coordinated devices management service 116 receives a request to implement a workflow in a coordinated device environment 119 from a user device 102. As described above, the user devices 102 can generate one or more user interfaces, such as graphical user interfaces, that allow for the specification of a workflow definition by user. For example, the graphical user interface can allow a user to selection a plurality of coordinated devices, such as via a drop down menu or library. The graphical user interface can then allow the user to select a communication path between the coordinated devices, such as via drawing of communication lines/paths via an input device. Still further, the graphical user interface can then allow the user to select or specify communication decision making logic. The communication decision making logic can include criteria for determining when communications should occur, such as threshold values. The communication making logic can further include branching information and associated criteria for specifying two or more branches for a communication path. The actual implementation of the graphical interface can be customized according to preferences/requirements provided by the user device 102 or a system administrator. The resulting specification can be sent to the coordinated devices management service 116 via an interface.

At (2), the coordinated devices management service 116 processes the workflow definition and validates the workflow definition. In one aspect, the coordinated devices management service 116 determines whether a model definition for the specified set of coordinated devices is available. As described above, the coordinated devices management service 116 can maintain a library of models that define for individual coordinated devices a set of inputs for the coordinated device, a set of outputs for the coordinated device and a corresponding set of protocols or interfaces, generally referred to as set of protocols, utilized in the communication. The module may be specific individual devices or alternatively a grouping of coordinated devices. The previously stored modules may be obtained based on a manual definition by a system administrator, previous implementations of coordinated device networks or via third party providers, such as the manufacturer or a module marketplace provider. If a module is not available for a specified coordinated device, the coordinated devices management service 116 obtains a manual definition of a module. For example, the coordinated devices management service 116 can cause the user device 102 to generate one or more menus or graphical menus that allow users or system administrators to specify the set of inputs, set of outputs or communication protocols. The user menus can also allow for suggestions or default settings based on manufacturer, type of device, type of interaction, or generic settings.

In another aspect, the coordinated devices management service 116 identifies the workflow attributes, namely the communication path of the coordinated devices 112, the communication decision making logic and any additional information required for implementing the workflow. In some embodiments, the coordinated devices management service 116 can determine that specified set of coordinated devices are the same or similar devices, or otherwise share common modules. Accordingly, the coordinated devices management service 116 can reuse at least portions of the identified information. The coordinated devices management service 116 automatically identifies or collects the mappings based on the specified communication path for the workflow. As described above, the mappings represent individual transformations of communications between each communication connection between two (or more) coordinated devices. Each individual mapping is based on the specified outputs from a first coordinated device to the inputs of a second coordinated device and further in accordance with the specified communication protocol for the first and second coordinated device. The mapping can include a specification of additional information required to allow for the communication between the two coordinated devices or based on the communication decision making logic (e.g., a specific of a priority field or importance field based on evaluation of criteria independent of the coordinated devices). The combination of mappings and communication decision making logic illustratively form the workflow definition.

In still a further aspect, the coordinated devices management service 116 can run a simulation of the specified workflow. For example, the coordinated devices management service 116 can cause a graphical simulation of communication flow or specify values for one or more coordinated devices (e.g., temperature settings, security badge readings, etc.) to determine whether the specified communication decision making logic is correct or needs additional input/modification. The coordinated devices management service 116 can generate outputs indicative of the results of the processing, such as color definitions indicative of characteristic of success. Additionally, the coordinated devices management service 116 can generate additional information outputs, such as log files or data files that allow for additional trouble shooting.

At (3), the coordinated devices management service 116 generates (or causes the generation) of executable code for the deployment to a coordinated device network 110. The executable code can by illustrative be implemented as executable code or commands interpreted by the coordinator 114 or as a separate component in the coordinated device network 110, such as a runtime executable by one or more coordinated devices 112 or the coordinator 114. The executable code facilitates the communication flow and communication transformation. In one embodiment, the executable code may not necessarily implement all the evaluation of the communication decision making logic or transformation, but may coordinate calls, such as tasks, that can be executed by an external service, such as an on-demand code execution service on the coordinated environment 110 or service provider environment 120. In another embodiment, the coordinated devices management service 116 can include executable code that at least in part implements the evaluation of the communication decision making logic and transformations without need to make additional calls (or limiting the need to make additional calls). The executable code can be deployed manually or automatically for implementation on one or more coordinated device environments 110.

Figure 8:
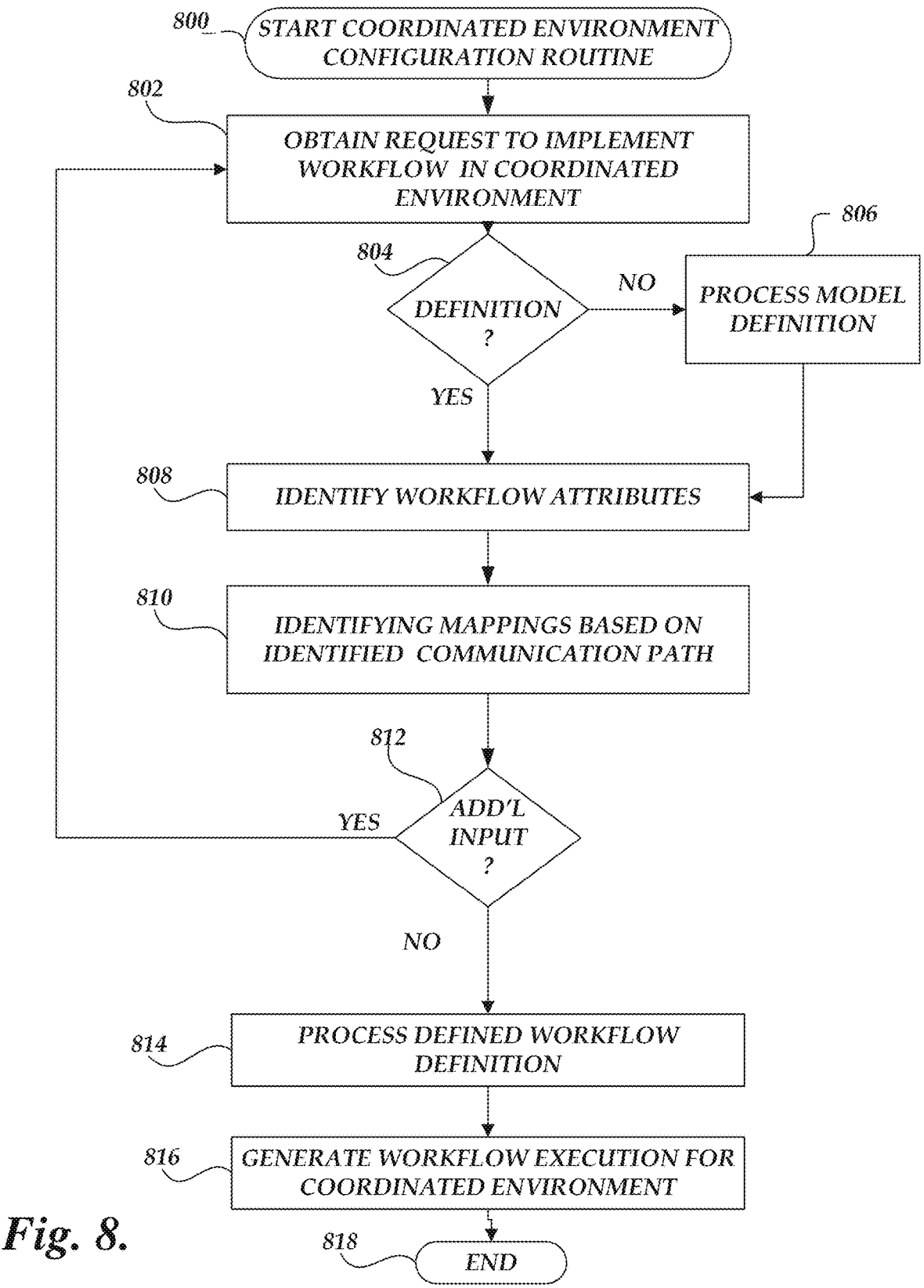
FIG. 8 is a flow diagram depicting illustrative interactions for a coordinate network management routine in accordance with aspects of the present application.

With reference now to FIG. 8, a coordinated environment configuration routine 800 for the workflow definitions by the coordinated devices management services 116 will be described. At block 802, the coordinated devices management service 116 receives a request to implement a workflow in a coordinated environment. As described above, the user devices 102 can generate one or more user interfaces, such as graphical user interfaces, that allow for the specification of a workflow definition by user. For example, the graphical user interface can allow a user to selection a plurality of coordinated devices, such as via a drop down menu or library. The graphical user interface can then allow the user to select a communication path between the coordinated devices, such as via drawing of communication lines/paths via an input device. Still further, the graphical user interface can then allow the user to select or specify communication decision making logic. The communication decision making logic can include criteria for determining when communications should occur, such as threshold values. The communication making logic can further include branching information and associated criteria for specifying two or more branches for a communication path. The actual implementation of the graphical interface can be customized according to preferences/requirements provided by the user device 102 or a system administrator. The resulting specification can be sent to the coordinated devices management service 116 via an interface.

At block 804, the coordinated devices management service 116 first determines whether a model definition for the specified set of coordinated devices is available. As described above, the coordinated devices management service 116 can maintain a library of models or modules that define for individual coordinated devices a set of inputs for the coordinated device, a set of outputs for the coordinated device and a set of protocols/interfaces utilized in the communication. The module may be specific individual devices or alternatively a grouping of coordinated devices. The previously stored modules may be obtained based on a manual definition by a system administrator, previous implementations of routine 800 or via third party providers, such as the manufacturer or a module marketplace provider. If a module is not available for a specified coordinated device, at block 804, the coordinated devices management service 116 obtains a manual definition of a module. For example, the coordinated devices management service 116 can cause the user device 102 to generate one or more menus or graphical menus that allow users or system administrators to specify the set of inputs, set of outputs or communication protocols. The user menus can also allow for suggestions or default settings based on manufacturer, type of device, type of interaction, or generic settings. Illustratively decision block 804 may be implemented for each specified coordinated device that was specified (e.g., a first module for a first coordinated device, a second module for a second coordinated device, a third module for a third coordinated device, etc.).

At block 806, the coordinated devices management service 116 identifies the workflow attributes, namely the communication path of the coordinated devices 112, the communication decision making logic and any additional information required for implementing the workflow. In some embodiments, the coordinated devices management service 116 can determine that specified set of coordinated devices are the same or similar devices, or otherwise share common modules. Accordingly, the coordinated devices management service 116 can reuse at least portions of the identified information. At block 808, the coordinated devices management service 116 automatically identifies, collects or generates mappings based on the specified communication path. Illustratively, the mappings represent individual transformations of communications between each communication connection between two (or more) coordinated devices. Each individual mapping is based on the specified outputs from a first coordinated device to the inputs of a second coordinated device and further in accordance with the specified communication protocol for the first and second coordinated device. The mapping can include a specification of additional information required to allow for the communication between the two coordinated devices or based on the communication decision making logic (e.g., a specific of a priority field or importance field based on evaluation of criteria independent of the coordinated devices). The combination of mappings and communication decision making logic illustratively form the workflow definition.

At decision block 812, a test is conducted to determine whether additional inputs are to be entered. Illustratively, the interaction with a user via a graphical user interface may be iterative in nature, such that the user can provide multiple inputs to the coordinated devices management service 116. If additional inputs/edits are indicated, the routine 800 returns to block 802 to receive additional inputs. Alternatively, once all the inputs have been processed, at block 814, the coordinated devices management service 116 processes the workflow definition. In one aspect, the coordinated devices management service 116 can run a simulation of the specified workflow. For example, the coordinated devices management service 116 can cause a graphical simulation of communication flow or specify values for one or more coordinated devices (e.g., temperature settings, security badge readings, etc.) to determine whether the specified communication decision making logic is correct or needs additional input/modification. The coordinated devices management service 116 can generate outputs indicative of the results of the processing, such as color definitions indicative of characteristic of success. Additionally, the coordinated devices management service 116 can generate additional information outputs, such as log files or data files that allow for additional trouble shooting.

At decision block 816, the coordinated devices management service 116 generates (or causes the generation) of executable code for the deployment to a coordinated device network 110. The executable code can by illustrative be implemented by the coordinator 114 or as a separate component in the coordinated device network 110. The executable code facilitates the communication flow and communication transformation. In one embodiment, the executable code may not necessarily implement all the evaluation of the communication decision making logic or transformation, but may coordinate calls, such as tasks, that can be executed by an external service, such as an on-demand code execution service on the coordinated environment 110 or service provider environment 120. In another embodiment, the coordinated devices management service 116 can include executable code that at least in part implements the evaluation of the communication decision making logic and transformations without need to make additional calls (or limiting the need to make additional calls). The executable code can be deployed manually or automatically for implementation on one or more coordinated device environments 110. At block 818, the routine 800 terminates.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for deployment of coordinated device network applications, the system comprising:
   a plurality of computing devices corresponding to user devices; and
   one or more computing devices associated with a coordinated devices management service for coordinating a first coordinated device and a second coordinated device having different modules for communication, wherein the coordinated devices management service is configured to:
      receive a manual selection of the first coordinated device from an interface generated on a user device;
      determine a first module associated with the first coordinated device, wherein the first module identifies:
         (i) a first set of inputs,
         (ii) a first set of outputs, and
         (iii) a first set of communication protocols for the first coordinated device, the first set of communication protocols including a first communication input protocol for receiving the first set of inputs associated with the first coordinated device and a first output communication protocol for transmitting the first set of outputs associated with the first coordinated device;
      receive, from the interface generated on the user device, a manual selection of the second coordinated device;
      receive, from the interface generated on the user device, a workflow definition between the first and second coordinated devices, wherein the workflow definition includes:
         (i) at least a communication path between the first and second coordinated devices, the communication path defined by a user illustration received from the interface; and
         (ii) communication decision making logic, the communication decision making logic providing criteria for allowing communications between the first and second coordinated devices and branching information of communication paths between the first and second coordinated devices;
      determine a second module associated with the second coordinated device, wherein the second module defines:
         (i) a second set of inputs,
         (ii) a second set of outputs, and
         (iii) a second set of communication protocols for the second coordinated device, the second set of communication protocols including a second communication input protocol for receiving the second set of inputs associated with the second coordinated device and a second output communication protocol for transmitting the second set of outputs associated with the second coordinated device;
      automatically generate a mapping between the first and second coordinated devices based on the communication paths defined in the workflow definition, wherein the mapping defines a transformation of the communications between the first and second coordinated devices to facilitate the communications between the first and second coordinated devices without requiring a modification to the first and second modules and wherein the mapping between the first and second coordinated devices is not previously defined, and further wherein the mapping is automatically generated based on the first set of outputs associated with the first coordinated device and the second set of inputs associated with the second coordinated device, and further wherein the mapping is automatically generated based on the branching information of communication paths between the first and second coordinated devices;
      generate a workflow corresponding to the communication decision making logic and the mapping; and
      cause the generation of executable code corresponding to the workflow, wherein the generated executable code implements a task, when executed by the one or more computing devices associated with the coordinated devices management service, causes the coordinated devices management service to at least:
         in response to receiving the communications between the first and second coordinated devices, route the communications between the first and second coordinated devices to a remote on-demand code execution system to perform the transformation of the communications defined in the mapping between the first and second coordinated devices, wherein a determination of the routing between the first and second coordinated devices to the remote on-demand execution system is based on routing criteria associated with the task.

2. The system of claim 1, wherein the coordinated devices management service is further operable to:
   receive a selection of a third coordinated device from a user device and a workflow definition between the third coordinated device and at least the first or second coordinated device,
   update the workflow definition to include at least a communication path between the first, second and third coordinated devices and additional communication decision making logic;

determining a third module associated with the third coordinated device and defining a third set of inputs, a third set of outputs and a third set of interfaces for the third coordinated device;

automatically generate an updated mapping between the first, second and third coordinated devices based on the communication path, wherein the mapping defines a transformation of communications based on the first, second and third modules, wherein the additional communication decision making logic and the updated mapping form an updated workflow.

3. The system of claim 1, wherein the coordinated devices management service is further operable to test a simulation of the formed workflow.

4. The system of claim 1, wherein the user device is further configured to generate one or more user interfaces for selecting the first and second coordinated devices and the workflow definition.

5. The system of claim 1, wherein the coordinated devices management service determines the module for at least the first or second coordinated device based on previously defined modules for a set of coordinated devices.

6. The system of claim 1, wherein the coordinated devices management service is further operable to:

determine that the first module has not been previously defined for the first coordinated device; and obtain a manual definition of the first module associated with the first coordinated device from the user device.

7. A computer-implemented method to manage deployment of a coordinated device network, the method comprising:

obtaining a manual selection of a plurality of coordinated devices from an interface generated on a user device, wherein the plurality of coordinated devices include at least a first coordinated device and a second coordinated device with different modules for communication;

obtaining a workflow definition between the plurality of coordinated devices from the interface, wherein the workflow definition includes at least a communication path between the first and second coordinated devices, the communication path defined by a user illustration obtained from the interface;

determining a first module associated with the first coordinated device of the plurality of coordinated devices, wherein the first module defines a first set of inputs, a first set of outputs and a first set of communication protocols for the first coordinated device and wherein the set of communication protocols include a first communication input protocol for receiving the first set of inputs associated with the first coordinated device and a first output communication protocol for transmitting the first set of outputs associated with the first coordinated device;

determining a second module associated with the second coordinated device of the plurality of coordinated devices, wherein the second module is different from the first module;

automatically identifying a mapping between the plurality of coordinated devices, wherein the mapping defines at least a transformation of communications between the first and second coordinated devices based on the first and second modules without requiring a modification to the first and second modules, wherein the identified mapping between the first plurality of devices is automatically generated responsive to the manual selection of the plurality of coordinated devices and based on the first set of outputs associated with the first coordinated device and the second set of inputs associated with the second coordinated device, and further wherein the mapping is automatically generated based on branching information of communication paths between the first and second coordinated devices;

generate a workflow based on the workflow definition and the mapping; and causing the generation of executable code corresponding to the formed workflow, wherein the generated executable code implements a task, when executed by one or more computing devices separate from the plurality of coordinated devices, causes the one or more computing devices to:

in response to receiving the communications between the first and second coordinated devices, route the communications between the first and second coordinated devices to a remote on-demand code execution system to perform the transformation of the communications defined in the mapping between the first and second coordinated devices, wherein a determination of the routing between the first and second coordinated devices to the remote on-demand execution system is based on routing criteria associated with the task.

8. The computer-implemented method of claim 7, wherein the workflow definition includes communication decision making logic further comprising receiving rendering resource configuration information.

9. The computer-implemented method of claim 8, wherein the communication decision logic includes a specification of criteria for allowing communications between two coordinated devices.

10. The computer implemented method of claim 8, wherein the communication decision logic includes a specification of criteria for selecting a communication path between multiple coordinated devices.

11. The computer implemented method of claim 7, wherein determining the first and second modules includes identifying one or more modules based on previously defined modules for a set of coordinated devices.

12. The computer implemented method of claim 7, wherein determining the first and second modules includes obtaining a manual definition for one or more modules not previously defined for a set of coordinated devices.

13. The computer-implemented method of claim 7 further comprising testing a simulation of the formed workflow prior to generating the executable code.

14. A computer-implemented method to manage deployment of a coordinated device network, the method comprising:

obtaining a specification of a plurality of coordinated devices from an interface generated by a user device, wherein the plurality of coordinated devices include at least a first coordinated device and a second coordinated device with different modules for communication;

obtaining a workflow definition between the plurality of coordinated devices from the interface, wherein the workflow definition includes at least a communication path between the first and second coordinated devices, the communication path defined by a user illustration obtained from the interface;

determining a first module associated with the first coordinated device, wherein the first module defines a set of inputs, a set of outputs and a set of interfaces for the first coordinated device, wherein the set of interfaces include a first interface for receiving the set of inputs associated with the first coordinated device and a second interface for transmitting the set of outputs associated with the first coordinated device;

determining a second module associated with the second coordinated device, wherein the second module is different from the first module;

automatically generating a mapping between the first and second coordinated devices, wherein the mapping defines a transformation of communications between the first and second coordinated devices based on the set of modules according to the workflow definition to facilitate communication between the first and second coordinated devices without requiring a modification to the first and second modules and wherein the mapping between the first and second coordinated devices is not previously generated, and wherein the mapping is automatically generated based on the first set of outputs associated with the first coordinated device and the second set of inputs associated with the second coordinated device, and further wherein the mapping is automatically generated based on branching information of communication paths between the first and second coordinated devices;

generating a workflow corresponding to the workflow definition and the mapping; and causing the generation of executable code corresponding to the workflow, wherein the generated executable code implements a task, when executed by one or more computing devices separate from the plurality of coordinated devices, causes the one or more computing devices to at least:

in response to receiving the communications between the first and second coordinated devices, route the communications between the first and second coordinated devices to a remote on-demand code execution system to perform the transformation of the communications between the first and second coordinated devices, wherein a determination of the routing between the first and second coordinated devices to the remote on-demand execution system is based on routing criteria associated with the task.

15. The computer-implemented method of claim 14, wherein the workflow definition includes communication decision making logic further comprising receiving rendering resource configuration information.

16. The computer implemented method of claim 14, wherein determining the first module associated with the first coordinated device includes identifying one or more modules based on previously defined modules for a set of coordinated devices.

17. The computer implemented method of claim 14, wherein determining the first module associated with the first coordinated device includes obtaining a manual definition for one or more modules not previously defined modules for a set of coordinated devices.

18. The system of claim 1, wherein the branching information includes a priority field of each coordinated device connected with the communication paths between the first and second coordinated devices.

19. The computer-implemented method of claim 7, wherein the branching information includes a priority field of each coordinated device connected with the communication paths between the first and second coordinated devices.

20. The computer-implemented method of claim 14, wherein the branching information includes a priority field of each coordinated device connected with the communication paths between the first and second coordinated devices.

21. The system of claim 1, wherein a message is generated by executing the executable code, and wherein the message includes the routing criteria associated with the task.

22. The computer-implemented method of claim 1, wherein the communication decision logic includes a criteria for allowing communications between two coordinated devices based on an occurrence time of the communications between the two devices.

23. The computer-implemented method of claim 7, wherein a message is generated by executing the executable code, and wherein the message includes the routing criteria associated with the task.

24. The computer-implemented method of claim 8, wherein the communication decision logic includes a criteria for allowing communications between the first and second coordinated devices based on an occurrence time of the communications between the first and second coordinated devices.

25. The computer-implemented method of claim 14, wherein a message is generated by executing the executable code, and wherein the message includes the routing criteria associated with the task.

26. The computer-implemented method of claim 15, wherein the communication decision logic includes a criteria for allowing communications between the first and second coordinated devices based on an occurrence time of the communications between the first and second coordinated devices.

* * * * *

UNITED STATES PATENT AND TRADEMARK OFFICE
CERTIFICATE OF CORRECTION

| | | |
|---|---|---|
| PATENT NO. | : 11,706,314 B2 | |
| APPLICATION NO. | : 16/200049 | |
| DATED | : July 18, 2023 | |
| INVENTOR(S) | : Kawarjit Bedi et al. | |

It is certified that error appears in the above-identified patent and that said Letters Patent is hereby corrected as shown below:

In the Specification

At Column 16, Line 64, after "of the" delete "c".

At Column 20, Line 66, delete "can by" and insert -- can be --.

At Column 22, Line 64, delete "can by" and insert -- can be --.

Signed and Sealed this
Thirty-first Day of October, 2023

*Katherine Kelly Vidal*

Katherine Kelly Vidal
*Director of the United States Patent and Trademark Office*